US012223800B2

(12) United States Patent
Marks

(10) Patent No.: US 12,223,800 B2

(45) Date of Patent: Feb. 11, 2025

(54) SYSTEMS AND METHODS FOR PLAYING A MULTIPLAYER, SINGLE-DEVICE, ELECTRONIC WAGERING GAME

(71) Applicant: Aristocrat Technologies Australia Pty Limited, North Ryde (AU)

(72) Inventor: Daniel Mordecai Marks, Decatur, GA (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 17/856,624

(22) Filed: Jul. 1, 2022

(65) Prior Publication Data

US 2022/0335785 A1 Oct. 20, 2022

Related U.S. Application Data

(63) Continuation of application No. 17/063,352, filed on Oct. 5, 2020, now Pat. No. 11,380,163, which is a continuation of application No. 16/011,313, filed on Jun. 18, 2018, now Pat. No. 10,810,838.

(51) Int. Cl.
*G07F 17/32* (2006.01)

(52) U.S. Cl.
CPC ...... *G07F 17/3244* (2013.01); *G07F 17/3276* (2013.01)

(58) Field of Classification Search
CPC ......................... G07F 17/3244; G07F 17/3276
See application file for complete search history.

(56) References Cited

U.S. PATENT DOCUMENTS 5,564,700 A 10/1996 Celona
6,312,333 B1 * 11/2001 Acres ...................... G07F 17/32 463/28
6,503,146 B2 1/2003 Walker
(Continued)

OTHER PUBLICATIONS

International Search Report and Written Opinion for International Application No. PCT/US2019/037731, dated Aug. 9, 2019. 9 pages.
(Continued)

*Primary Examiner* — Seng H Lim
(74) *Attorney, Agent, or Firm* — Armstrong Teasdale LLP

(57) ABSTRACT

An electronic gaming machine performs operations comprising: (i) receiving, from a first player of the electronic gaming machine, a first credit contribution; (ii) receiving, from a second player of the electronic gaming machine, a second credit contribution; (iii) aggregating the first credit contribution and the second credit contribution to create a combined credit balance; (iv) determining, based on the first credit contribution and the second credit contribution, a relative contribution of each of the first player and the second player to the combined credit balance; (v) determining, in response to at least one mutual wager, at least one outcome of the wagering game; (vi) one of incrementing and decrementing the combined credit balance based on the at least one outcome; (vii) receiving, from at least one of the first player and the second player, an instruction to cash out of the wagering game; and (viii) distributing a pro rata share of the combined credit balance to the at least one player in proportion to the relative contribution of the at least one player.

20 Claims, 12 Drawing Sheets

(56) References Cited

U.S. PATENT DOCUMENTS

| | | | | |
|---|---|---|---|---|
| 7,056,215 | B1 | 6/2006 | Olive | |
| 9,330,532 | B2 | 5/2016 | Gagner | |
| 2004/0198487 | A1 | 10/2004 | Schneider | |
| 2006/0084491 | A1 | 4/2006 | DiCarlo | |
| 2007/0060316 | A1 | 3/2007 | O'Halloran | |
| 2008/0220856 | A1 | 9/2008 | Lynch | |
| 2008/0305861 | A1 | 12/2008 | Marks | |
| 2009/0124317 | A1 | 5/2009 | Dinkla | |
| 2010/0004058 | A1* | 1/2010 | Acres | G07F 17/3272 463/27 |
| 2010/0304846 | A1 | 12/2010 | Ogino | |
| 2010/0317424 | A1 | 12/2010 | Hornik | |
| 2013/0296016 | A1* | 11/2013 | Acres | G07F 17/32 463/20 |
| 2013/0303249 | A1* | 11/2013 | Acres | G07F 17/34 463/20 |
| 2014/0018155 | A1 | 1/2014 | Nelson | |
| 2014/0057705 | A1 | 2/2014 | Elias | |
| 2015/0279164 | A1 | 10/2015 | Miller | |
| 2015/0310703 | A1 | 10/2015 | Katz | |
| 2017/0140611 | A1 | 5/2017 | Marantelli | |
| 2018/0165916 | A1 | 6/2018 | Marantelli | |
| 2019/0051120 | A1 | 2/2019 | Acres | |

OTHER PUBLICATIONS

Notice of Allowance dated Jul. 6, 2020 for U.S. Appl. No. 16/011,313 (pp. 1-7).

Office Action (Non-Final Rejection) dated Jan. 7, 2022 for U.S. Appl. No. 17/063,352 (pp. 1-6).

Office Action (Notice of Allowance and Fees Due (PTOL-85)) dated Mar. 9, 2022 for U.S. Appl. No. 17/063,352 (pp. 1-5).

* cited by examiner

SYSTEMS AND METHODS FOR PLAYING A MULTIPLAYER, SINGLE-DEVICE, ELECTRONIC WAGERING GAME

CROSS REFERENCE TO RELATED APPLICATIONS

This application is a continuation of U.S. patent application Ser. No. 17/063,352, filed Oct. 5, 2020, which is a continuation of U.S. patent application Ser. No. 16/011,313, filed Jun. 18, 2018, the contents of which are incorporated herein by reference in their entireties.

TECHNICAL FIELD

The field of disclosure relates generally to electronic gaming, and more particularly to systems and methods for playing a multiplayer, single-device, electronic wagering game, in which a plurality of players participate in a multiplayer wagering game provided and controlled by a single electronic gaming machine.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards form any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

In addition, many conventional EGMs are only structured to provide single player wagering games. For example, many conventional EGMs are not capable of accepting wagers from multiple players as part of a single wagering game, nor are they capable of generating game outcomes in association with greater than a single player. Rather, in most cases, a single player sits down at a particular EGM, provides his or her wager, and gameplay commences based upon the single-player wager. Moreover, although some multiplayer electronic gaming systems have been developed in the past, these systems typically generate a plurality of game outcomes, based upon a plurality of independent wagers, for a plurality of independent players. In other words, conventional multiplayer systems are not capable of multiplayer gameplay on a single EGM; rather, gameplay is spread across multiple EGMs and game outcomes are individually determined at each standalone EGM.

BRIEF DESCRIPTION

In one aspect, an electronic gaming machine is provided. The gaming machine includes a display, a player interface configured to receive a player input, a processor for controlling a wagering game, and a tangible, non-transitory, computer-readable storage medium having instructions stored thereon that, in response to execution by the processor, cause the processor to perform operations comprising: (i) receiving, from a first player of the electronic gaming machine and via the player interface, a first credit contribution; (ii) receiving, from a second player of the electronic gaming machine and via the player interface, a second credit contribution; (iii) aggregating the first credit contribution and the second credit contribution to create a combined credit balance; (iv) determining, based on the first credit contribution and the second credit contribution, a relative contribution of each of the first player and the second player to the combined credit balance; (v) determining, in response to at least one mutual wager, at least one outcome of the wagering game; (vi) one of incrementing and decrementing the combined credit balance based on the at least one outcome; (vii) receiving, from at least one of the first player and the second player, an instruction to cash out of the wagering game; and (viii) distributing a pro rata share of the combined credit balance to the at least one player in proportion to the relative contribution of the at least one player.

In another aspect, an electronic gaming machine is provided. The gaming machine includes a display, a player interface configured to receive a player input, a processor for controlling a wagering game, and a tangible, non-transitory, computer-readable storage medium having instructions stored thereon that, in response to execution by the processor, cause the processor to perform operations comprising: (i) receiving, from a first player of the electronic gaming machine and via the player interface, a first credit contribution; (ii) communicating, to a client device of a second player, an invitation to join the wagering game; (iii) receiving, in response to the invitation and from the client device of the second player, a second credit contribution; (iv) aggregating the first credit contribution and the second credit contribution to create a combined credit balance; (v) determining, based on the first credit contribution and the second credit contribution, a relative contribution of each of the first player and the second player to the combined credit balance;

(vi) determining, in response to at least one mutual wager, at least one outcome of the wagering game; (vii) one of incrementing and decrementing the combined credit balance based on the at least one outcome; (viii) receiving, from at least one of the first player and the second player, an instruction to cash out of the wagering game; and (ix) distributing a pro rata share of the combined credit balance to the at least one player in proportion to the relative contribution of the at least one player.

In yet another aspect, an electronic gaming system is provided. The gaming system includes a display, a processor for controlling a wagering game, a tangible, non-transitory, computer-readable storage medium having instructions stored thereon that, in response to execution by the processor, cause the processor to perform operations comprising: (i) receiving, from a plurality of client devices of each of a plurality of players of the wagering game, a plurality of credit contributions; (ii) aggregating the plurality of credit contributions to create a combined credit balance; (iii) determining, based on the plurality of credit contributions, a relative contribution of each of the plurality of players to the combined credit balance; (iv) displaying, on the display, at least one of a) the combined credit balance and b) the relative contributions of each of the plurality of players, wherein the display is positioned to be visible to the plurality of players; (v) determining, based on at least one mutual wager of the plurality of players, at least one outcome of the wagering game; (vi) one of incrementing and decrementing the combined credit balance based on the at least one outcome; (vii) receiving, from at least one player of the plurality of players, an instruction to cash out of the wagering game; and (viii) distributing a pro rata share of the combined credit balance to the at least one player in proportion to the relative contribution of the at least one player to the combined credit balance.

BRIEF DESCRIPTION OF THE DRAWINGS

An example embodiment of the subject matter disclosed will now be described with reference to the accompanying drawings.

DETAILED DESCRIPTION

In various embodiments, an electronic gaming system for playing a multiplayer, single-device, wagering game is described. For example, in at least one embodiment, the multiplayer wagering game is controlled by a single electronic gaming machine and is accessible to, and can be played by, a plurality of players. Each player may select a credit contribution, and a plurality of credit contributions may be provided and pooled in the wagering game. Specifically, the gaming machine may aggregate the credit contribution of each player to create a combined credit balance, and the players may select a mutual wager, which may, as a result of the aggregated credit balance, be greater than a wager that any single player might make playing alone. The players may thus pool their resources to gain access to a variety of enhanced or unlockable gameplay features, such as unlockable bonus features, new tiers of a progressive jackpot, improved return to player (RTP), and the like.

Any of the players participating in the multiplayer wagering game may, in at least some embodiments, cash out of the wagering game at any time. When a player selects an option to cash out, the gaming machine may distribute a pro rata share of the combined credit balance, which may be incremented and decremented during gameplay according to the rules of the wagering game, according to a relative contribution provided by the player to the combined credit balance. For example, a player who contributes 20% to the combined credit balance when the player joins the wagering game may receive 20% of the combined credit balance when the player cashes out of the wagering game.

Figure 1:
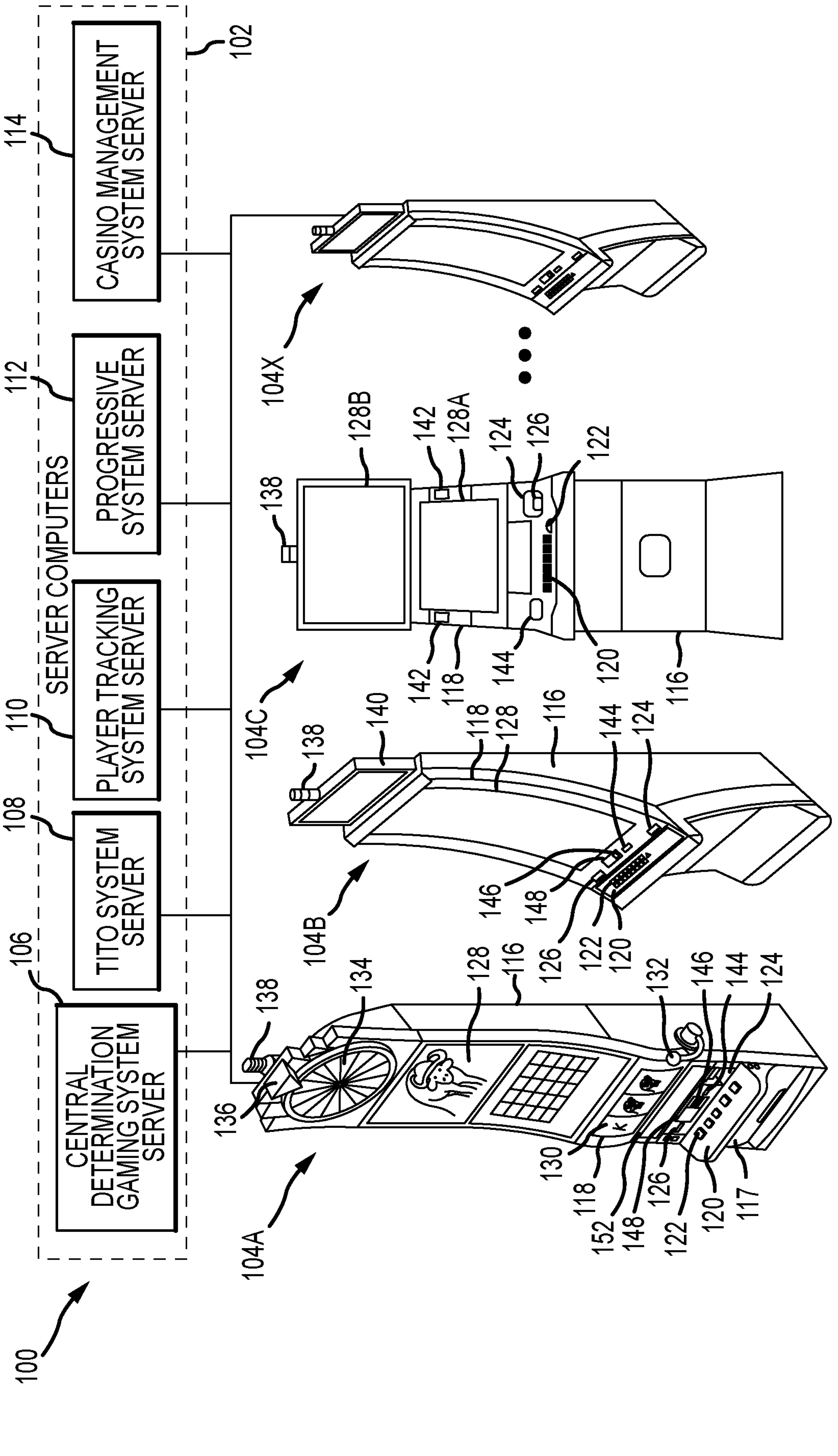
FIG. 1 is a schematic diagram of a plurality of electronic gaming devices (EGMs) networked with various gaming-related servers.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct (e.g., peer to peer) and/or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 117 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
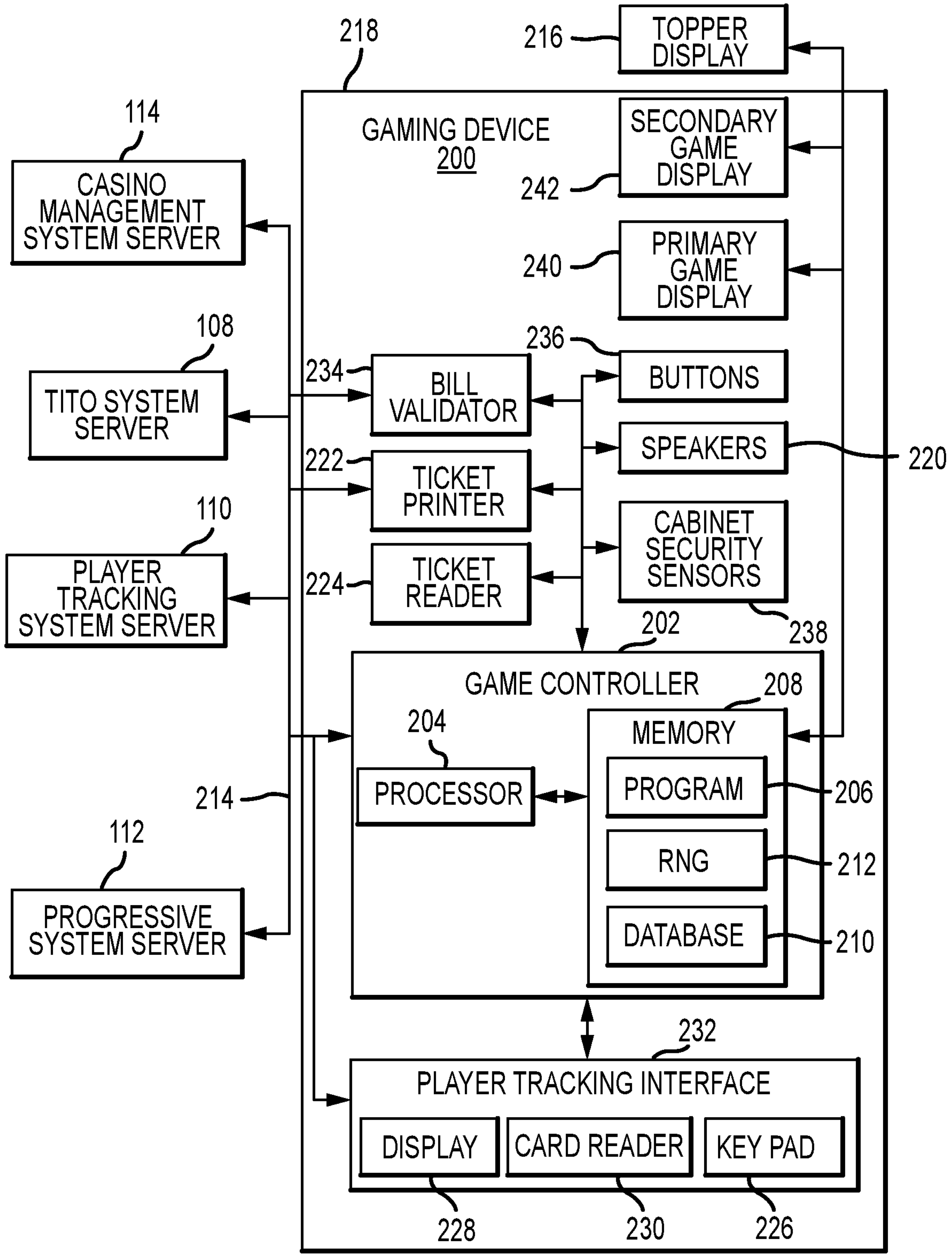
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 117 that opens to provide access to the interior of gaming device 104B. Main door 117, or service door, is typically used by service personnel to refill ticket-out printer 126 and collect bills and tickets inserted into bill validator 124. Main door 117 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A has a curvature radius from top to bottom and/or a plurality of landscape flat panel displays. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases may be included in database 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS 360® system manufactured by Aristocrat® Technologies, Inc. Player tracking system server 110 is used to track play (e.g., amount wagered and time of play) for individual players so that an operator may reward players in a loyalty program. The player may use player tracking interface 232*a* to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Moreover, in various embodiments player tracking points may be allocated to an individual player in accordance with an individual player's contribution to one or more wagering games. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
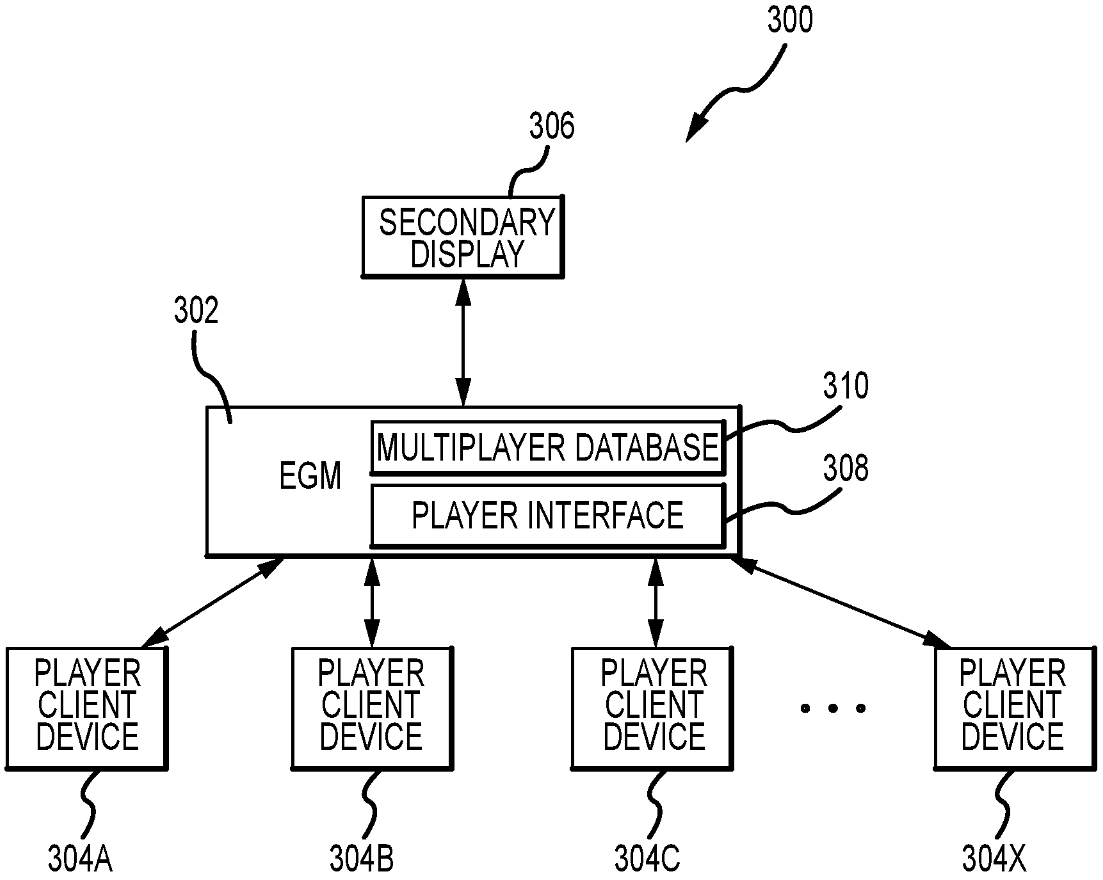
FIG. 3 is a schematic diagram of an exemplary electronic gaming system for playing a multiplayer, single device, electronic wagering game.

FIG. 3 is a schematic diagram of an exemplary electronic gaming system 300 for playing a multiplayer, single-device, electronic wagering game. In the exemplary embodiment, system 300 includes an EGM 302, which may correspond to any of EGMs 104A-104X (shown in FIG. 1). System 300 may also include a plurality of player client devices, such as a first player client device 304A, a second player client device 304B, a third player client device 304C, and a fourth player client device 304X. Although four player client devices 304A-304X are shown, it will be appreciated that any suitable number of player client devices 304A-304X may be included, such as, for example, hundreds or even thousands of player client devices 304A-304X. As described herein, each player client device 304A-304X may be communicatively coupled to EGM 302, such as via any suitable communications medium. For example, player client devices 304A-304X may communicate with EGM 302 via any suitable wireless communications standard, such as BLUETOOTH, WIFI, any near field communications (NFC) standard, and the like. Player client devices 304A-304X may communicate with EGM 302 via any local area network (LAN), any wide area network (WAN), and/or the Internet.

System 300 may also include at least one secondary display 306. Secondary display 306 may be any suitable television display, computer monitor, digital signage, and the like. In at least one embodiment, secondary display 306 is any display used in conjunction with, or as a replacement for, a display of EGM 302. For example, in at least one embodiment, secondary display 306 may be a main display, such as a large flat panel display, mounted overhead and/or behind a bar, and clearly visible to a plurality of players, such as a plurality of players having a plurality of player client devices 304A-304X. In other embodiments, any suitable number of secondary displays 306 may be used, such as a plurality of secondary displays 306 organized to create a bank of displays. Further, in at least some embodiments, system 300 excludes secondary display 306.

Secondary display 306 may be communicatively coupled to EGM 302 and may receive and display various gameplay data, as described herein, from EGM 302. To this end, secondary display 306 may communicate with EGM 302 via any suitable wireless communications standard, such as BLUETOOTH, WIFI, any near field communications (NFC) standard, and the like. Secondary display 306 may communicate with EGM 302 via any computer network, such as, for example, via any local area network (LAN), any wide area network (WAN), and/or the Internet.

EGM 300 may, in various embodiments, include a player interface 308 (or "button deck"), such as, for example, any player interface capable of receiving player input. In some embodiments, as described above, player interface 308 includes one or more mechanical pushbuttons and/or a touchscreen display capable of displaying one or more software or "virtual" buttons. For example, in at least some embodiments, player interface 308 includes one or more player input buttons 236 and/or primary game display 240, as described above. Player interface 308 may thus display a variety of gameplay buttons, which may appear as mechanical pushbuttons and/or software or virtual buttons. Exemplary buttons include, but are not limited to, "bet" buttons or "max bet" buttons, one or more "spin" buttons (the selection of which may cause one or more reels to spin), one or more "join" and/or "invite" buttons, as described in greater detail herein, a "wager" or "mutual wager" button and/or dialog box, as described in greater detail herein, "cash out" buttons, and the like. In addition, in the case of virtual buttons, any of the foregoing options may be displayed on such buttons. For example, a virtual button may display a "spin" option at one point during gameplay, and another option, such as a "cash out" option at another point during gameplay.

EGM 302 may, in addition, include a multiplayer database 310. Multiplayer database 310 may be unique to EGM 302, in that many conventional EGMs are designed for single player use and are not designed to accommodate multiple players (and so do not include a multiplayer database). In the exemplary embodiment, multiplayer database 310 may be stored on a tangible, non-transitory, computer readable storage medium of EGM 302, such as any volatile or non-volatile computer memory of EGM 302. In some embodiments, multiplayer database 310 is stored on a server computer, such as any server computer 112-114, as described above.

Figure 4:
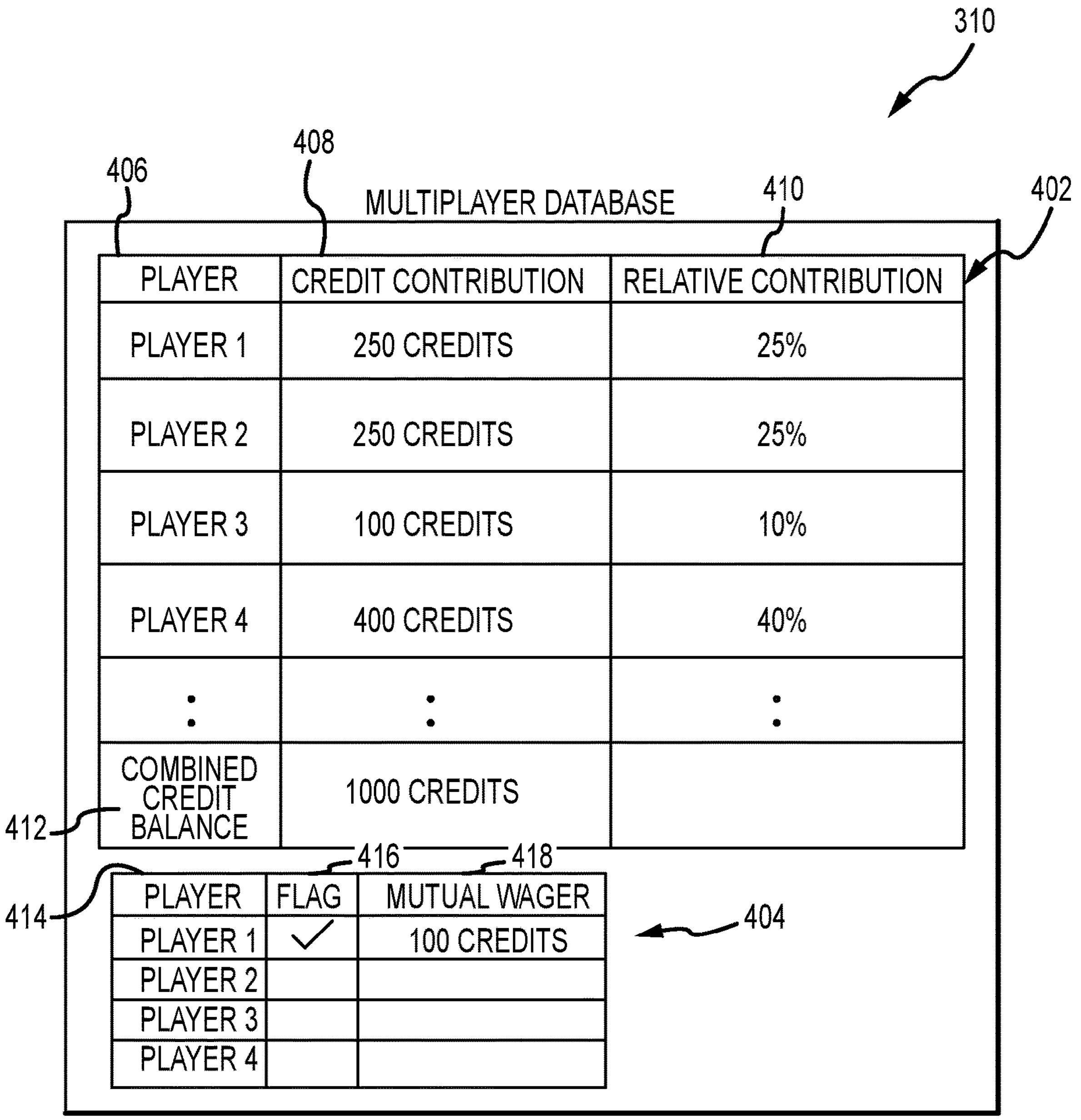
FIG. 4 is a schematic diagram of an exemplary multiplayer database for use with the electronic gaming system shown in FIG. 3.

FIG. 4 is a schematic diagram of an exemplary multiplayer database 310 for use with system 300 (shown in FIG. 3). As shown, multiplayer database 310 may include a number of tables, such as, for example, a player contribution table 402 and/or a mutual wager table 404.

In the exemplary embodiment, player contribution table 402 may include a variety of fields or columns, such as, for example, any field or column that may be used to keep track of one or more player contributions to a multiplayer, single-device, wagering game, as described herein. For example, player contribution table 402 may include a player column 406, a credit contribution column 408, and/or a relative contribution column 410.

In various embodiments, player column 406 may list one or more players participating in a particular wagering game, such as those who have joined by way of EGM 302 and/or by way of a player client device 304A-304X. Thus, player column 406 is dynamic and may change from one wagering game to the next as well as during a particular wagering game, such as, for example, as players join and/or cash out of the wagering game. In the example shown, player column 406 specifies four players, e.g., player 1, player 2, player 3, and player 4, to indicate that these four players are playing together.

Credit contribution column 408 may specify a credit contribution of each of the players identified in player column 406. As described herein, each player, such as players 1, 2, 3, and 4, may contribute a number of credits to a multiplayer game. As each player contributes credits, credit contribution column 408 may be updated to reflect the player's current contribution. A combined credit balance 412 may tally, or aggregate, the total credit contribution of all players. In the illustrated example, player 1 has contributed 250 credits, player 2 has contributed 250 credits, player 3 has contributed 100 credits, and player 4 has contributed 400 credits. In the example, the combined credit balance 412 is thus 1,000 credits.

Relative contribution column 410 may specify a relative contribution to the combined credit balance 412 of each player. In the exemplary embodiment, a relative contribution may be calculated for each player by dividing each player's credit contribution to the combined credit balance 412, shown at column 408, by the combined credit balance 412, to determine a percentage of the combined credit balance 412 provided by each player. In the example shown, player 1 has provided a relative contribution of 25%, player 2 has provided a relative contribution of 25%, player 3 has provided a relative contribution of 10%, and player 4 has provided a relative contribution of 40%.

Mutual wager table 404 may also occupy multiplayer database 310. In the exemplary embodiment, mutual wager table 404 may include a variety of fields or columns, such as, for example, any field or column that may be used to keep track of a mutual wager in a multiplayer, single-device, wagering game, as described herein. For example, mutual wager table 404 may include a player column 414, a flag column 416, and/or a mutual wager column 418.

In various embodiments, player column 414 may list one or more players participating in a particular wagering game, such as those who have joined by way of EGM 302 and/or by way of a player client device 304A-304X. Thus, player column 406 is dynamic and may change from one wagering game to the next as well as during a particular wagering game, such as, for example, as players join and/or cash out of the wagering game. In the example shown, player column 414 specifies four players, e.g., player 1, player 2, player 3, and player 4, to indicate that the four players are playing together.

Flag column 416 may specify a player who is responsible for setting a mutual wager. Specifically, as described herein, one or more of the players participating in a multiplayer wagering game may be allowed to set a mutual wager, and flag column 416 may be used to specify the player, or players, who are responsible for establishing the mutual wager. Flag column 416 may therefore include a flag, such as a checkmark or another binary indicator, usable to designate or identify a player or players. In the example shown, player 1 has established the mutual wager, and a flag is set in association with player 1 to so indicate.

Mutual wager column 418 may specify a mutual wager set or established by a player, or players, during a wagering game. As described above, in the example shown, player 1 has established the mutual wager. As such, mutual wager column 418 specifies the mutual wager established for play of the multiplayer wagering game by player 1. In this example, the value of the mutual wager established by player 1 is 100 credits. However, it will be appreciated that any suitable mutual wager may be set by any of the players listed at player column 414. In addition, as the combined credit balance 412 increases and/or decreases, players may increase and/or decrease the mutual wager based upon their preferences. For example, the mutual wager specified at column 418 may be increased as combined credit balance 412 increases, such as, for example, to unlock bonus features in the multiplayer wagering game that would not be otherwise available at a lower mutual wager. As described herein, players may thus pool their resources to gain access to higher payouts in the multiplayer wagering game, improved RTP, additional bonus tiers, unlockable bonus features, and the like.

Figure 5A:
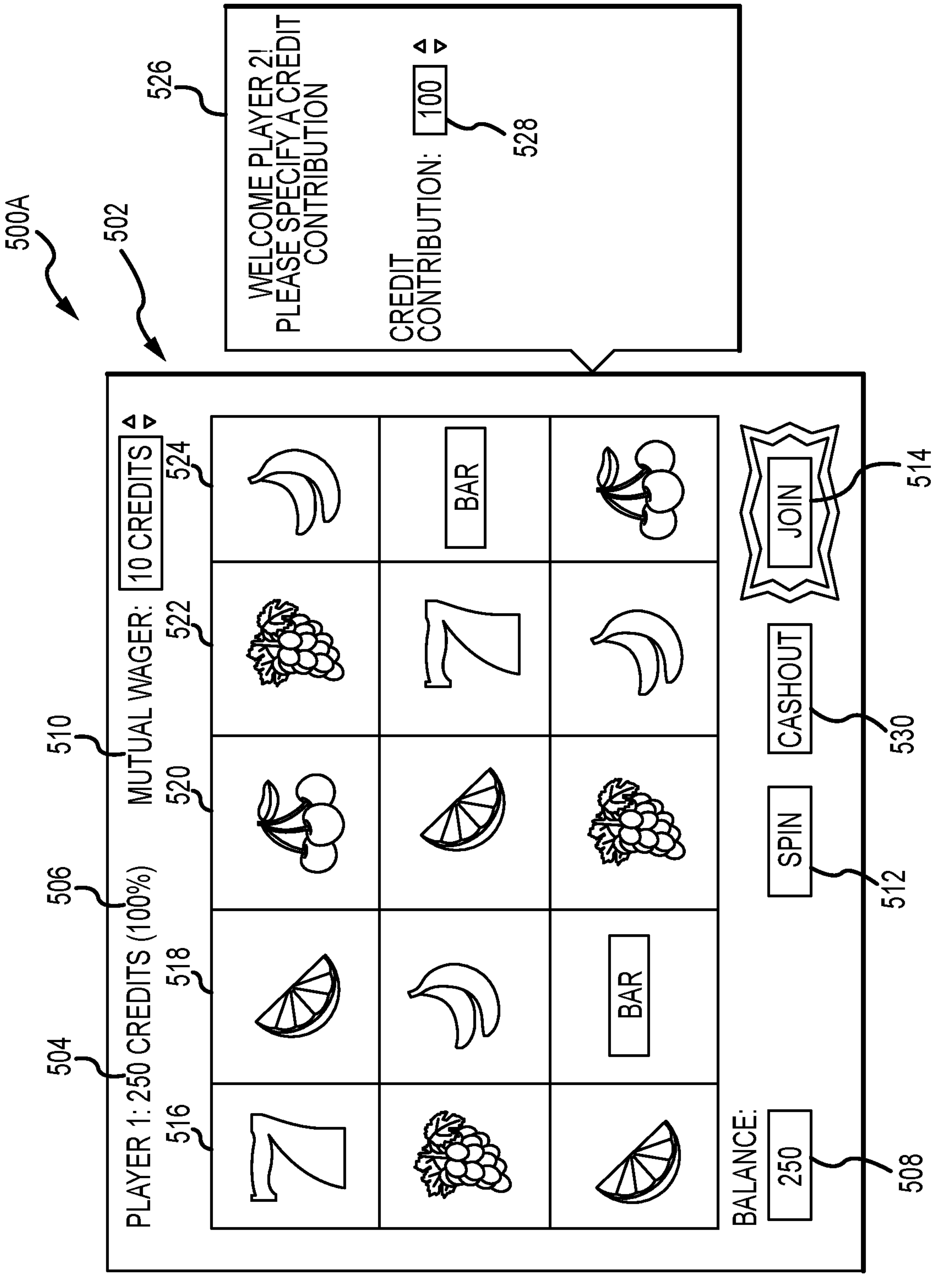
FIG. 5A is a schematic diagram of a first exemplary display screen for use with the electronic gaming system shown in FIG. 3, in which a first player physically interfaces with a single EGM of the system to initiate a multiplayer wagering game, and in which a second player physically interfaces with the single EGM to join the multiplayer wagering game.

FIG. 5A is a schematic diagram of a first exemplary display screen 500A for use with electronic gaming system 300, in which a first player physically interfaces with a single EGM, such as EGM 302, to initiate a multiplayer wagering game, and in which a second player physically interfaces with the single EGM 302 to join the wagering game. Likewise, FIG. 5B is a schematic diagram of a second exemplary display screen 500B for use with electronic gaming system 300, in which the first player and second player jointly participate in the multiplayer wagering game.

Figure 5B:
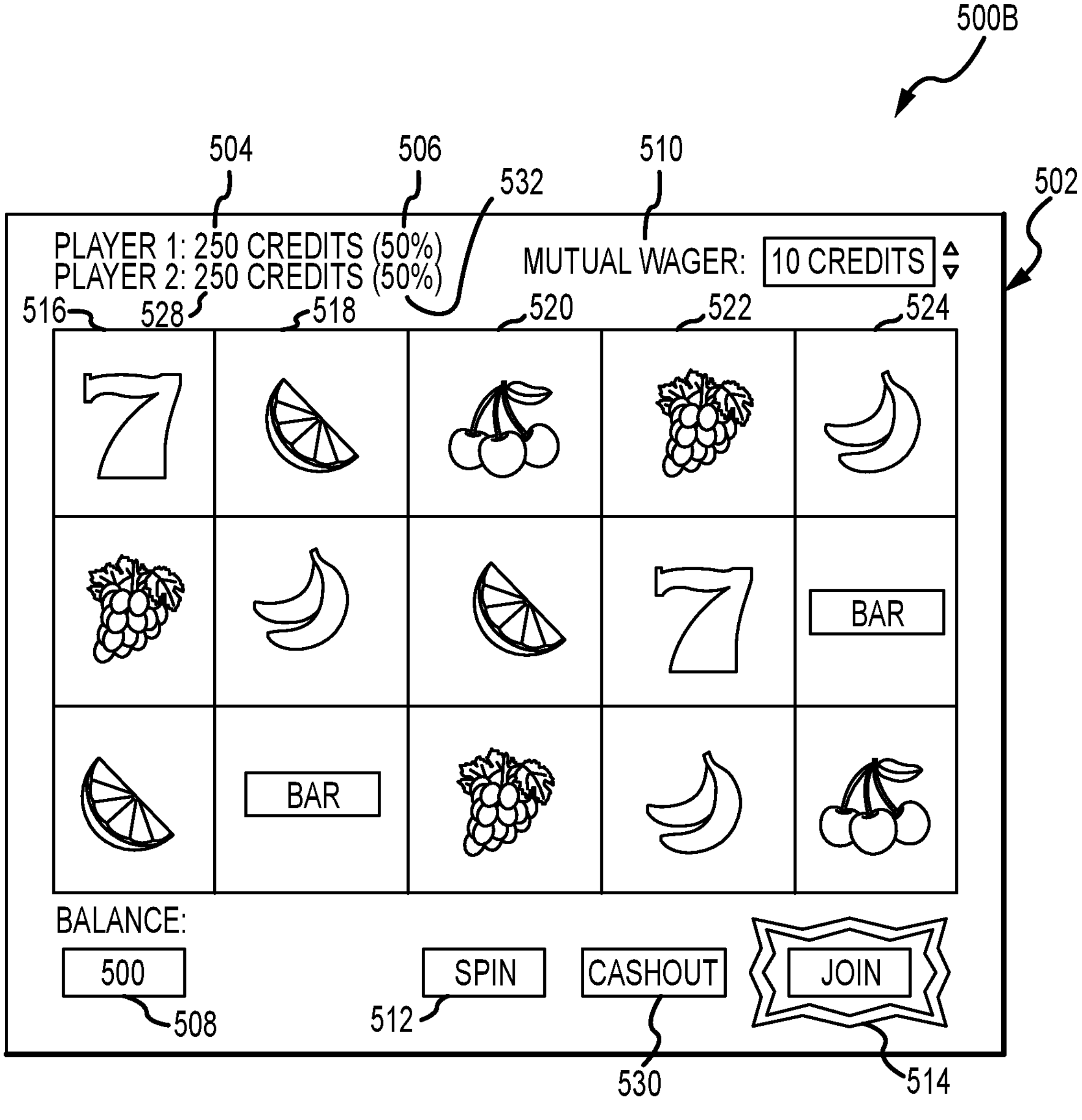
FIG. 5B is a schematic diagram of a second exemplary display screen for use with the electronic gaming system shown in FIG. 3, in which in which the first player and second player jointly participate in the multiplayer wagering game.

Accordingly, and with combined reference to FIGS. 5A and 5B, in the exemplary embodiment, a first player (or player 1) may initiate a multiplayer wagering game 502, such as, for example, by making a first credit contribution 504 to the wagering game 502. First credit contribution 504 may be provided, as described herein, by way of bill validator 234, ticket reader 224, and/or player tracking interface 232. For example, the first player may provide monetary currency in the wagering game 502 via bill validator 234 and/or the first player may provide credits in the wagering game 502 via ticket reader 224. In addition, the first player may provide a player tracking card to player tracking interface 232, which may cause processor 204 to deduct the first credit contribution 504 from a player tracking account of the first player.

In addition, in at least some embodiments, first credit contribution 504 may be displayed in conjunction with a first relative contribution 506 and/or a combined credit balance 508. In this example, the first player has provided a first credit contribution 504 in the amount of 250 credits. The relative contribution 506 of the first player is thus 100% (prior to participation by other players), and the combined credit balance 508, which is wholly attributable at the start of the multiplayer wagering game 502 to the first player, is 250 credits.

In addition, the first player may specify a mutual wager 510. In this example, the first player has specified an initial mutual wager 510 of 10 credits; however, as shown, the first player may use any suitable player interface or graphical user interface (GUI) element, such as a dialog box, to specify an initial mutual wager 510 according to the first player's preferences.

In the exemplary embodiment, multiplayer wagering game 502 also includes a spin button 512, a join button 514, and a cash out button 530. As described herein, buttons 512, 514, and 530 may be mechanical pushbuttons and/or software/GUI elements (e.g., virtual buttons). The first player may select spin button 512 to cause one or more mechanical and/or virtual reels, such as reels 516, 518, 520, 522, and/or 524, to spin.

As those of skill will appreciate, each time spin button 512 is selected, processor 204 may receive a random number (e.g., from RNG 212), which may be used to select a reel stop for each of reels 516-524. In addition, processor 204 may evaluate the symbols displayed on each of reels 516-

524, once they have stopped, to determine an outcome of the multiplayer wagering game. Specifically, if the outcome is a winning outcome, combined credit balance 508 may be incremented by the amount won. If, on the other hand, the outcome is non-winning, combined credit balance 508 may be decremented by the amount of mutual wager 510.

In the exemplary embodiment, a second player (or player 2) may select join button 514 to join multiplayer wagering game 502. For example, the second player may physically interface with EGM 302 to join multiplayer wagering game 502. In this respect, and in at least one embodiment, players 1 and 2 may physically interface with EGM 302, such as within a casino, to participate in multiplayer wagering game 502. In such an embodiment, a bench or other multiplayer seating may be provided for the comfort of each player. In some embodiments, a second player may be physically located on another EGM, such as a second EGM that is different from and, in some cases, adjacent to, EGM 302. For example, the second EGM may be in the same bank of EGMs as EGM 302, on the same casino property as EGM 302, and the like. In such a case, the second EGM 302 may display some or all of what is displayed by EGM 302, as described above, such that, for example, what is shown on EGM 302, including reels 516-524, participation interface 526, and/or join button 514 are replicated on the second EGM.

In response to selection of join button 514, a participation interface 526, such as a dialog box or another GUI element, may appear in conjunction with multiplayer wagering game 502. Participation interface 526 may prompt the second player for a second credit contribution 528, which the second player may specify using any suitable input mechanism. In some embodiments, the second credit contribution 528 may be provided to the multiplayer wagering game 502 by way of bill validator 234, ticket reader 224, and/or player tracking interface 232. For example, the second player may provide monetary currency in the wagering game 502 via bill validator 234 and/or the second player may provide credits in the wagering game 502 via ticket reader 224. In addition, the second player may provide a player tracking card to player tracking interface 232, which may cause processor 204 to deduct the second credit contribution 528 from a player tracking account of the second player.

Referring to FIG. 5B, once the second player has joined multiplayer wagering game 502, second credit contribution 528 is displayed, such as, for example, in conjunction with (or in juxtaposition to) first credit contribution 504. In addition, relative contributions of each player are calculated, as described above, and displayed. In this example, first credit contribution 504 is 250 credits, and second credit contribution 528 is 250 credits. Accordingly, first relative contribution 506 is recalculated and has a value, in this example, of 50%. Similarly, a second relative contribution 532 is calculated, and has a value, in this example, of 50%. Combined credit balance 508 is also updated by processor 204 to reflect the total aggregated credit contributed to wagering game by the first player and the second player. In this instance, combined credit balance 508 is updated to show a value of 500 credits (e.g., 250 credits per player).

Moreover, either of the first player and/or the second player may specify a mutual wager 510. In the example, neither player has updated mutual wager 510 from the value established by the first player, as described above. However, mutual wager 510 may be altered by any player participating in multiplayer wagering game 502 at any time during multiplayer wagering game 502. For example, the first player and/or the second player may increase mutual wager 510 based upon second credit contribution 528 to unlock one or more bonus features in the wagering game 502, to increase a return to player (RTP) in the wagering game 502, and/or to achieve a variety of other improved or enhanced gameplay features, as described elsewhere herein.

Mutual wager 510 may thus be established by any player participating in multiplayer wagering game 502. For example, in some embodiments, and as described above, the first player (e.g., the player initiating wagering game 502) may establish an initial mutual wager 510, which any player joining wagering game 502 may review and accept prior to joining wagering game 502. In at least some embodiments, each player participating in multiplayer wagering game 502 may mutually agree upon a mutual wager 510 established by any of the players participating in the game, such as, for example, the player who initiates wagering game 502.

In another embodiment, each player joining multiplayer wagering game 502 may be provided an option to review and approve a mutual wager 510 established by another player prior to joining wagering game 502. Such an option may be provided, for example, via participation interface 526. In yet another embodiment, players may take turns, such as from one wager to the next, or from one group of wagers to the next, setting mutual wager 510. For example, the first player may set mutual wager 510 for a first number of spins (e.g., 10 spins), and the second player may set 510 for a second, consecutive, number of spins (e.g., the next 10 spins). In another embodiment, processor 204 may randomly select a player participating in wagering game 502 to set mutual wager 510, such as from one wager to the next and/or, as described above, in conjunction with a group of wagers or spins. In yet another embodiment, a player with a greatest contribution to combined credit balance 508 may select mutual wager 510 and/or the first player may be designated as a host of wagering game 502. If the first player is designated as the host, the first player may be responsible for establishing mutual wager 510 and/or the first player may be provided the ability to delegate responsibility for establishing mutual wager 510 to one or more other players, such as for a specified period of time, for a specified number of spins, and the like.

In the exemplary embodiment, any number of players may join multiplayer wagering game 502, such as, for example, and as described above, by sequentially selecting join button 514 and providing a credit contribution. Once all players who wish to participate in a particular round of wagering (e.g., during a particular spin) have joined, processor 204 may spin reels 516-524, as described above, to determine a game outcome. If the game outcome is a winning outcome, combined credit balance 508 may be incremented by the amount won. Additionally, each player's individual credit contribution may be incremented by an amount of the win proportional to their respective contribution percentage. Conversely, if the game outcome is non-winning, combined credit balance 508 may be decremented by the amount of mutual wager 510.

As described briefly above, any player participating in wagering game 502 may control mutual wager 510. Likewise, any player participating in wagering game 502 may control an option to spin reels 516-524. For example, in some embodiments, a first player may always control when reels 516-524 are spun. However, in another embodiment, the players participating in wagering game 502 may take turns controlling the option to spin, such that each player sequentially and for a specified number of spins controls the option to spin. For example, a first play may control the option to spin reels 516-524 for a first number of spins (e.g., 10 spins), and a second player may control the option to spin reels 516-524 for a second number of spins (e.g., 10 spins) after the first player completes all of his spins. In another embodiment, a player, such as the first player, may control when reels 516-524 are spun until a symbol combination appearing on reels 516-524 corresponds to a winning and/or a non-winning symbol combination (e.g., based upon a comparison to a paytable of wagering game 502). In response to a winning and/or non-winning combination, the option to spin reels 516-524 may be passed to a next player participating in wagering game 502, such as a second player.

Moreover, in some embodiments, a player placing a largest mutual wager 510 is allowed to control an option to spin reels 516-524, such as, for example, until another player places a larger mutual wager 510, until the player reduces his wager, and/or until the player cashes out. Further, in some embodiments, an option to spin reels 516-524 is assigned between players participating in wagering game 502 at random and from one spin to the next and/or from one group of spins to the next. Further still, in some embodiments, a power to spin reels 516-524 may be shared between some or all of the players participating in wagering game 502. For example, reels 516-524 may only spin, in some embodiments, when some or all of the players participating in wagering game 502 indicate their assent, such as by selecting a "spin" button, to spin. Thus, a power to spin or control reels 516-524 may be variously assigned between players and moved from one player to the next during gameplay, such that different players may, at different times and based upon different criteria, have the power to spin reels 516-524.

In addition, in any of the embodiments for controlling the power to spin reels 516-524 described herein, a "spin button," such as a virtual spin button, as described above, may come and go on a player's respective player interface. For instance, a spin button may appear on a player interface associated with a player who has the power to spin reels 516-524, and when the power to spin passes to another player, as described above, the spin button may be removed and displayed on a player interface associated with the player who has received the power to spin. Similarly, where each player must indicate assent to spin reels 516-524, a spin button may appear on each player interface, and each player may be required to select his or her spin button before reels 516-524 can be spun.

In such an embodiment, each player's spin button (e.g., if it is a virtual button and/or a mechanical button including an LED or LCD display) may be customized to provide some information about how many players participating in the wagering game have indicated assent to spin reels 516-524 and how many have not and/or how many still need to indicate assent. For example, if three players have indicated assent and five players have not (in the case that eight players are playing together), each player's spin button may indicate "3/8" and/or a similar indication, such that each player knows that three players have agreed to spin and that five players still need to do so. Thus, a spin button and/or an option to spin reels 516-524 may move around from player interface to player interface during gameplay and based upon the specific rules associated with wagering game 502.

Although the various options to control the power to spin reels 516-524 are described above with references to FIG. 5A and FIG. 5B, it will be appreciated that these options and embodiments are equally applicable to the embodiments described below and should not be construed as limited to any particular embodiment described here. Rather, in all of the embodiments described herein, the power to control reel spins may be variously allocated between players, and "spin" buttons may, in addition, be provided, relocated, and customized as described herein.

During gameplay, any player participating in multiplayer wagering game 502 may select an option to cash out, such as a cash out button 530, which may, as described herein, be a mechanical pushbutton and/or a software or virtual button. In response to selection of cash out button 530, a cash out interface (not shown) may be displayed, which the player who wishes to cash out may use to self-identify. For example, if the second player wishes to cash out of wagering game 502, the second player may select cash out button 530. In response to selection of cash out button 530, a cash out interface may appear, and the second player may indicate in the cash out interface that it is he or she who has made the cash out request.

In response to receiving a cash out request, processor 204 may distribute a pro rata share of combined credit balance 508 to the player making the cash out request, such as, for example, in proportion to the relative contribution of the player. For instance, in the example above, the second player may receive 50% of combined credit balance 508 in response to a request to cash out of wagering game 502 by the second player (and at any time during wagering game 502), because the second player contributed 50% to combined credit balance 508. Alternatively, in at least some embodiments, a player may receive an amount based on the amount of the player's current individual credit contribution. For example, a player who contributes 100 credits may receive a percentage of the 100 credit contribution based upon an increase and/or decrease in combined credit balance 508 since the time the player provided the 100 credit contribution. More particularly, if combined credit balance has increase by 10% since the player provided the 100 credit contribution and the player makes a cash out request, the player may receive 110 credits.

Figure 6A:
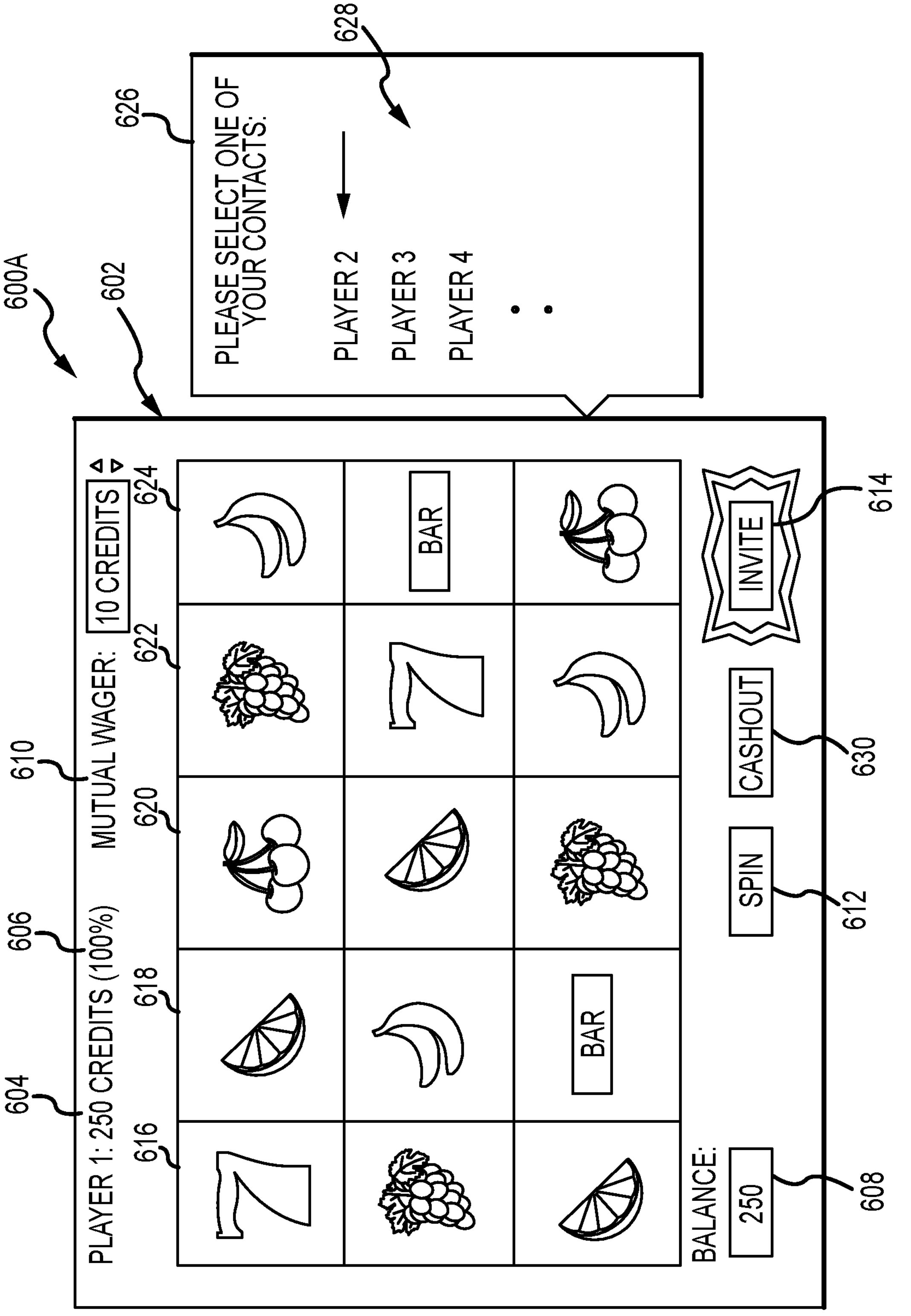
FIG. 6A is a schematic diagram of a third exemplary display screen for use with the electronic gaming system shown in FIG. 3, in which a first player physically interfaces with an EGM of the system to initiate a multiplayer wagering game, and in which the first player sends an invitation from the EGM to a client device of a second player to join the multiplayer wagering game.
Figure 6B:
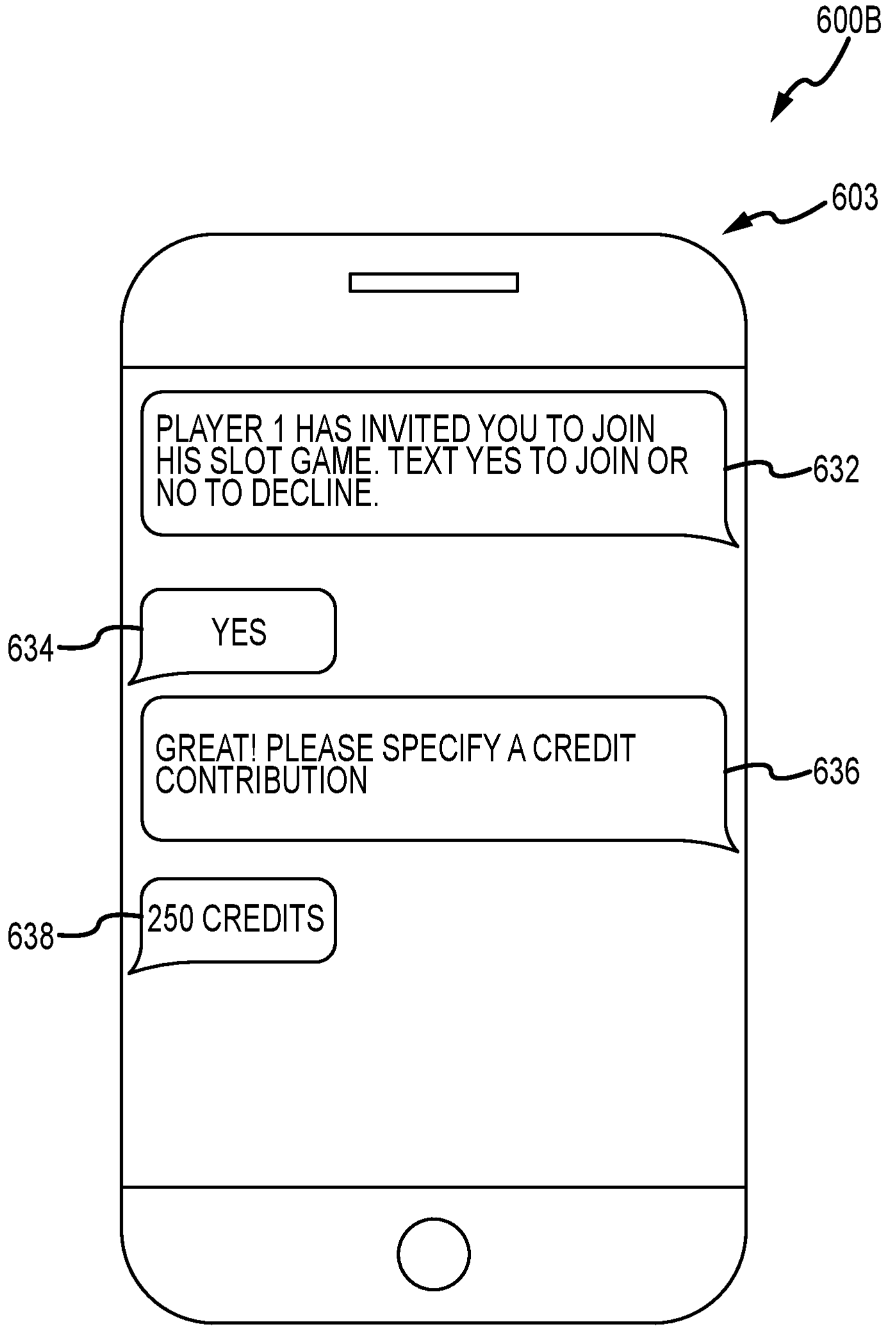
FIG. 6B is a schematic diagram of a fourth exemplary display screen for use with the electronic gaming system shown in FIG. 3 and for display by the client device of the second player, in which the second player is provided an option to join the multiplayer wagering game initiated by the first player.
Figure 6C:
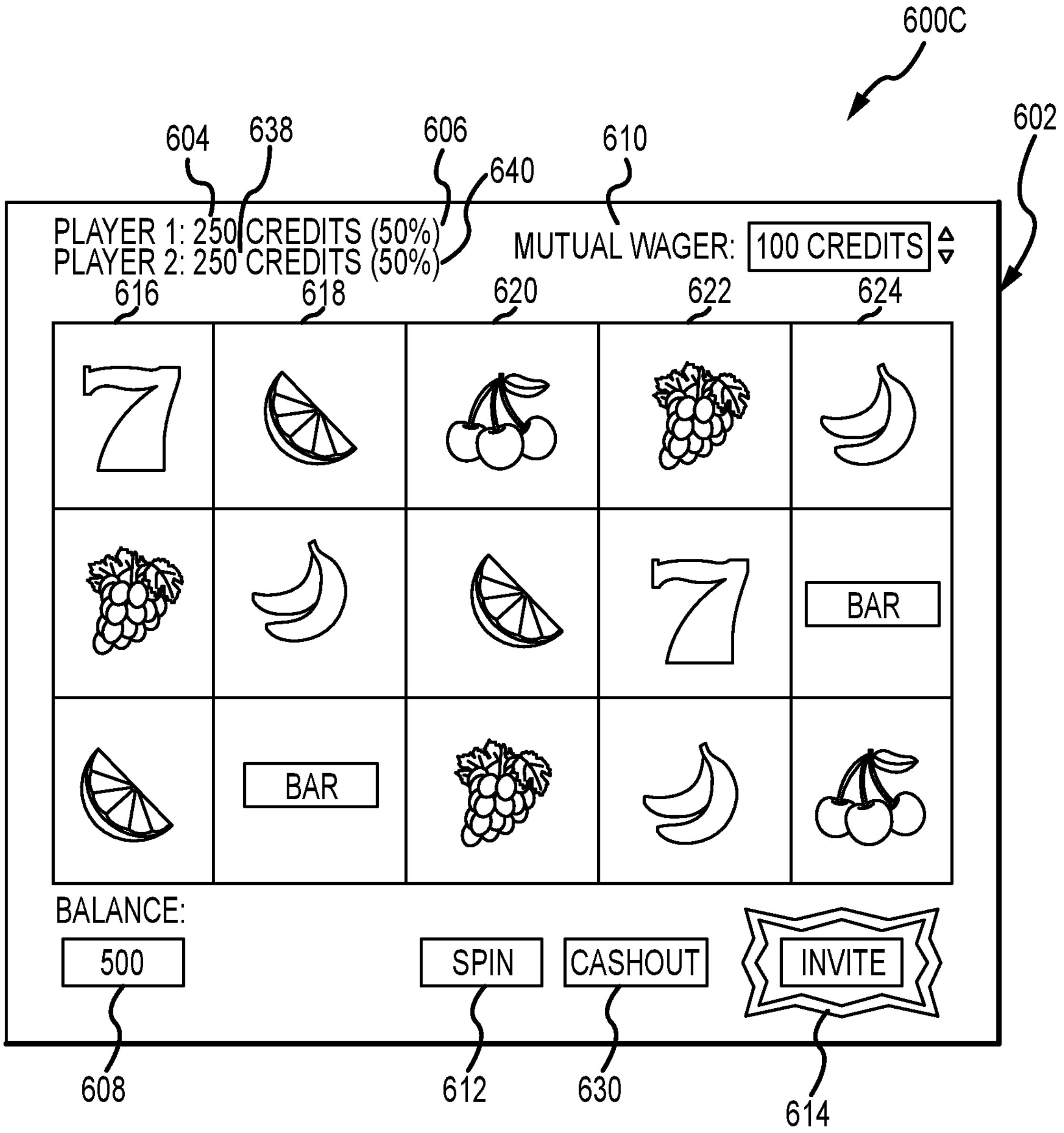
FIG. 6C is a schematic diagram of a fifth exemplary display screen for use with the electronic gaming system shown in FIG. 3, in which the first player and second player jointly participate in the multiplayer wagering game.

FIG. 6A is a schematic diagram of a third exemplary display screen 600A for use with the electronic gaming system 300, in which a first player physically interfaces with EGM 302 to initiate a multiplayer wagering game 602, and in which the first player sends an invitation from EGM 302 to a client device 603 of a second player to join multiplayer wagering game 602. FIG. 6B is a schematic diagram of a fourth exemplary display screen 600B for use with electronic gaming system 300 for display by client device 603, in which the second player is provided an option to join multiplayer wagering game 602 in response to the invitation. FIG. 6C is a schematic diagram of a fifth exemplary display screen 600C for use with electronic gaming system 300, in which the first player and second player jointly participate in the multiplayer wagering game 602. As used herein, a player client device is any suitable mobile communications device, such as, for example, a smartphone.

Accordingly, and with combined reference to FIGS. 6A-6B, in the exemplary embodiment, a first player (or player 1) may initiate a multiplayer wagering game 602. For example, the first player may initiate wagering game 602 by making a first credit contribution 604 to the wagering game 602. First credit contribution 604 may be provided, as described herein, directly to EGM 302, by way of bill validator 234, ticket reader 224, and/or player tracking interface 232. For example, the first player may provide monetary currency in the wagering game 602 via bill validator 234 and/or the first player may provide credits in the wagering game 602 via ticket reader 224 and/or via a credit or debit card. In addition, the first player may provide a player tracking card to player tracking interface 232, which may cause processor 204 to deduct the first credit contribution 604 from a player tracking account of the first player. In addition, in some embodiments, the first player may interface with EGM 302 via a client device (e.g., a smartphone) of the first player to initiate wagering game 602, as described herein.

In addition, in at least some embodiments, first credit contribution 604 may be displayed in conjunction with a first relative contribution 606 and/or a combined credit balance 608. In this example, the first player has provided a first credit contribution 604 in the amount of 250 credits. The relative contribution 606 of the first player is thus 100% (prior to participation by other players), and the combined credit balance 608, which is wholly attributable at the start of the multiplayer wagering game 602 to the first player, is 250 credits.

In addition, the first player may specify a mutual wager 610. In this example, the first player has specified an initial mutual wager 610 of 10 credits; however, as shown, the first player may use any suitable player interface or graphical user interface (GUI) element, such as a dialog box, to specify an initial mutual wager 610 according to the first player's preferences.

In the exemplary embodiment, multiplayer wagering game 602 also includes a spin button 612, an invite button 614, and a cash out button 630. As described herein, these buttons 612, 614, and 630 may be mechanical pushbuttons and/or software/GUI elements (e.g., virtual buttons). The first player may select spin button 612 to cause one or more mechanical and/or virtual reels, such as reels 616, 618, 620, 622, and/or 624, to spin.

As those of skill will appreciate, each time spin button 612 is selected, processor 204 may receive a random number (e.g., from RNG 212), which may be used to select a reel stop for each of reels 616-624. In addition, processor 204 may evaluate the symbols displayed on each of reels 616-624, once they have stopped, to determine an outcome of multiplayer wagering game 602. Specifically, if the outcome is a winning outcome, combined credit balance 608 may be incremented by the amount won. If, on the other hand, the outcome non-winning, combined credit balance 608 may be decremented by the amount of mutual wager 610.

To invite a player to wagering game 602, the first player may select invite button 614. In response to selection of invite button 614, an invitation interface 626, such as a dialog box or another GUI element, may appear in conjunction with multiplayer wagering game 602. Invitation interface 626 may prompt the first player to select another player to invite, such as, for example, another player in a list of contacts stored on the first player's client device, another player in the casino, another player on a bank of gaming machines with EGM 302, another player connected to the first player via a social media account, such as a FACEBOOK or INSTAGRAM account, and the like. In the exemplary embodiment, a list of players 628 is provided, and the first player selects one player from the list 628 to invite. In other embodiments, the first player may select multiple players from list 628 to invite to wagering game 602.

In response to selecting a player from list 628, processor 204 may transmit an invitation to a client device of the selected player. For example, as shown with reference to FIG. 6B, the first player selects the second player (e.g., player 2) from list 628, and an invitation 632 is provided to client device 603 of the second player. In various embodiments, invitation 632 may be provided on client device 603 in any suitable format, such as, for example, as shown, in a text message. In some embodiments, the selected player may reply via text 634 to accept invitation 632. For example, the selected player may reply "yes" to the invitation. In response to acceptance of invitation 632, processor 204 may prompt the selected player to provide a credit contribution to wagering game 602, such as, for example, via a second text message 636. In the exemplary embodiment, the selected player may, in response, enter a desired (or second) credit contribution 638, which may be deducted from a player account that is linked to the player and/or client device 603 of the player.

Referring to FIG. 6C, once the second player has joined multiplayer wagering game 602, second credit contribution 638 is displayed, such as, for example, in conjunction with first credit contribution 604. In addition, relative contributions of each player are calculated, as described above, and displayed. In this example, first credit contribution 604 is 250 credits, and second credit contribution 638 is 250 credits. Accordingly, first relative contribution 606 is recalculated and has a value, in this example, of 50%. Similarly, a second relative contribution 640 is calculated, and has a value, in this example, of 50%. Combined credit balance 608 is also updated by processor 204 to reflect the total aggregated credit contributed to wagering game by the first player and the second player. In this instance, combined credit balance 608 is updated to show a value of 500 credits (e.g., 250 credits per player). As described above, the players are thus able to pool their financial resources in the wagering game to gain access to a variety of enhanced and/or bonus features, such as improved RTP, unlockable bonus features, higher progressive jackpot tiers, and the like.

Moreover, either of the first player and/or the second player may specify mutual wager 610. In the example, neither player has updated mutual wager 610 from the value established by the first player, as described above. However, mutual wager 610 may be altered by any player participating in multiplayer wagering game 602 at any time during multiplayer wagering game 602. For example, the first player and/or the second player may increase mutual wager 610 to unlock one or more bonus features in the wagering game 602 and/or to increase an RTP in the wagering game 602. For example, and in addition to the mutual wager options described above, a player may specify and/or propose a new or updated mutual wager 610 via client device 603, such as, for example, when the second player accepts invitation 632. In such a case, a first player and/or a plurality of players already participating in wagering game 602 may be prompted to accept the new or proposed mutual wager 610 before it is used in wagering game 602.

In the exemplary embodiment, any number of players may be invited to and/or may join, via invitation, multiplayer wagering game 602. Once all players who wish to participate in a particular round of wagering (e.g., during a particular spin) have joined, processor 204 may spin reels 616-624, as described above, to determine a game outcome. If the game outcome is a winning outcome, combined credit balance 608 may be incremented by the amount won. Conversely, if the game outcome is non-winning, combined credit balance 608 may be decremented by the amount of mutual wager 610.

During gameplay, any player participating in multiplayer wagering game 602 may select an option to cash out, such as cash out button 630, which may, as described herein, be a mechanical pushbutton and/or a software or virtual button. In response to selection of cash out button 630, a cash out interface (not shown) may be displayed, which the player who wishes to cash out may use to self-identify. For example, if the second player wishes to cash out of wagering game 602, the second player may select cash out button 630. In response to selection of cash out button 630, a cash out interface may appear, and the second player may indicate in the cash out interface that it he or she who has made the cash out request.

In response to receiving a cash out request, processor 204 may distribute a pro rata share of combined credit balance 608 to the player making the cash out request, such as, for example, in proportion to the relative contribution of the player. For instance, in the example above, the second player may receive 50% of combined credit balance 608 in response to a request to cash out of wagering game 602 by the second player (and at any time during wagering game 602), because the second player contributed 50% to combined credit balance 608.

Figure 7:
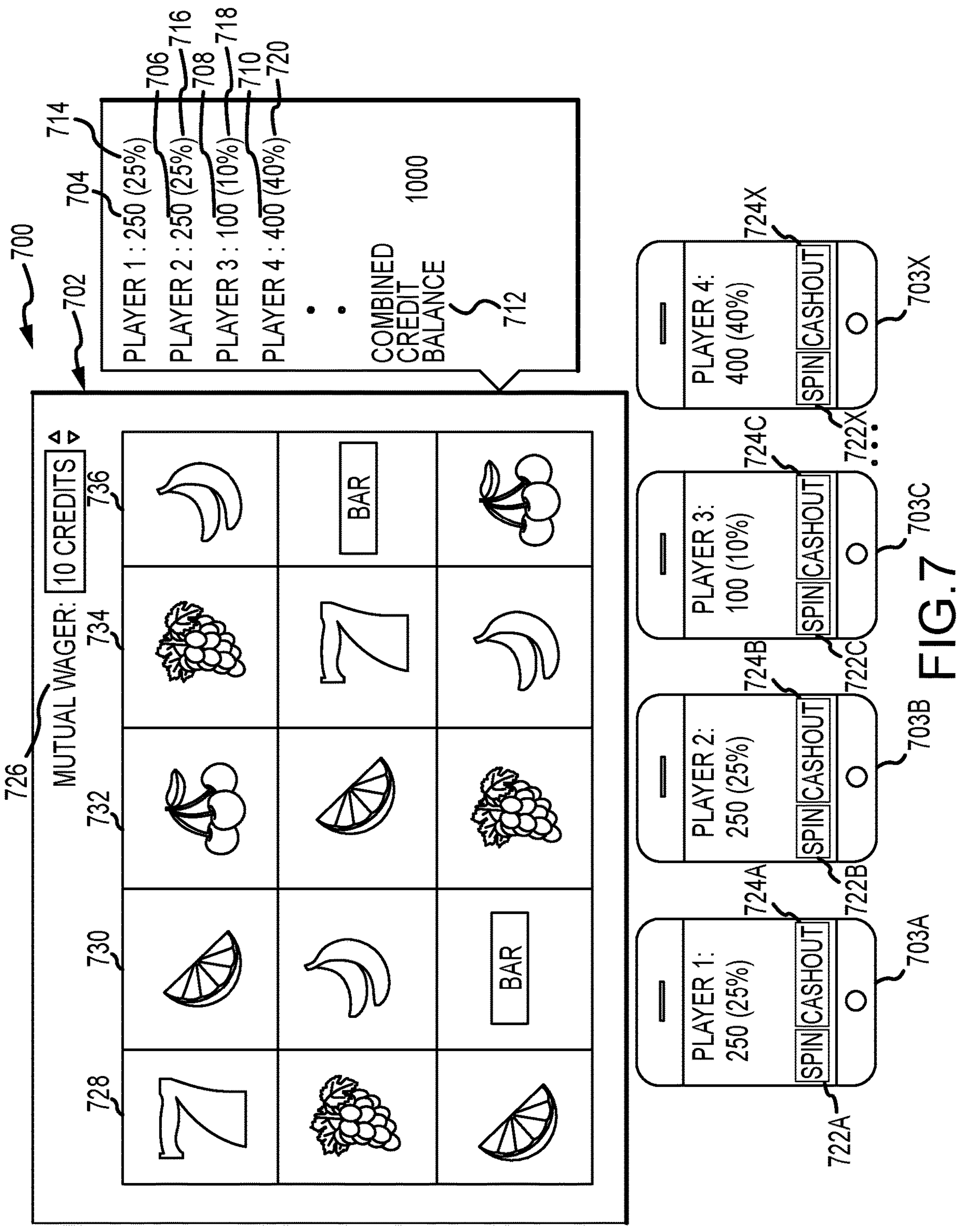
FIG. 7 is a schematic diagram of a sixth exemplary display screen for use with the electronic gaming system shown in FIG. 3 and for display on a secondary display of the electronic gaming system, in which a plurality of players join a multiplayer wagering game, and in which and in which the plurality of players participate in the multiplayer wagering game via a plurality of player client devices.

FIG. 7 is a schematic diagram of a sixth exemplary display screen 700 for use with electronic gaming system 300 and for display on a secondary display, such as secondary display 306, of electronic gaming system 300, in which a plurality of players join a multiplayer wagering game 702, and in which the plurality of players participate in multiplayer wagering game 702 via a plurality of player client devices, such as a first player client device 703A, a second player client device 703B, a third player client device 703C, and a fourth player client device 703X. In the exemplary embodiment, secondary display 306 may be a large overhead (or "main") display positioned for viewing by a large number of players, such as, for example, behind a bar or atop a bank of EGMs, such as atop EGMs 104A-104X. In addition, as described above, a player client device is, as used herein, any suitable mobile communications device, such as, for example, a smartphone.

Accordingly, in the exemplary embodiment, multiplayer wagering game 702 may be displayed on secondary display 306, such that a plurality of players, such as a first player (player 1), a second player (player 2), a third player (player 3), and/or a fourth player (player 4) may view, and participate in, multiplayer wagering game 702. Although in this example four players are described, it will be appreciated that any suitable number of players may participate in multiplayer wagering game 702.

Multiplayer wagering game 702 may, in various embodiments, be initiated as described herein. More particularly, in the exemplary embodiment, any player, such as the first player (player 1), may initiate multiplayer wagering game 702. For example, the first player may initiate wagering game 702 by making a first credit contribution 704 to the wagering game 702 (in this example, the first player's contribution 704 is 250 credits). For instance, the first player may interface with EGM 302 via first player client device 703A to initiate wagering game 702, as described herein. In other embodiments, the first player may physically interface with EGM 302, such as, for example, where EGM 302 is a bar top gaming machine, and where the display of EGM 302 is mirrored or replicated to secondary display 306.

In addition, a plurality of additional players, such as the second, third, and fourth players, may join wagering game 702 at any time, such as after the first player has initiated wagering game 702 and/or in conjunction with the first player, such that wagering game 702 is, in effect, initiated by the joining of each player to wagering game 702. As such, each of the second, third, and fourth players may specify their respective credit contributions. For example, the second player may make a second credit contribution 706, the third player may make a third credit contribution 708, and the fourth player may make a fourth credit contribution 710. In the example shown, the second credit contribution is 250 credits, the third credit contribution is 100 credits, and the fourth credit contribution is 400 credits.

Moreover, as described herein, processor 204 may aggregate or tally each of the credit contributions 704-710 to calculate a combined credit balance 712. In the example shown, combined credit balance 712 totals 1,000 credits. In addition, a relative contribution of each player to wagering game 702 may be determined. For example, in the example, a first relative contribution 714 of the first player, a second relative contribution 716 of the second player, a third relative contribution 718 of the third player, and a fourth relative contribution 720 of the fourth player may be determined. As described herein, players are thus able to pool their financial resources to gain access to one or more enhanced gameplay features, such as improved RTP, larger payouts, higher progressive tiers, unlockable bonus features, and the like.

In the exemplary embodiment, the credit contribution, the relative contribution, and/or the combined credit balance may be displayed on each player client device 703A-703X. For example, in at least one embodiment, and as shown, each player client device 703A-703X displays the associated player's credit contribution 704-710 and relative contribution 714-720. In addition, each player client device 703A-703X may display a cash out button and/or a spin button, each of which may function as described herein. For example, first player client device 703A may display a first spin button 722A and a first cash out button 724A, second player client device 703B may display a second spin button 722B and a second cash out button 724B, third player client device 703C may display a third spin button 722C and a third cash out button 724C, and fourth player client device 703X may display a fourth spin button 722X and a fourth cash out button 724X.

In addition, in at least some embodiments, each player client device 703A-703X may display a mutual wager option (not shown), as described herein, that a player associated with a respective player client device 703A-703X may use to specify a desired mutual wager. For example, players may use a mutual wager option displayed on their client device 703A-703X to vote on and/or take turns selecting a mutual wager 726, which may be displayed for group viewing on secondary display 306.

As described herein, once all players who wish to participate in a particular round of wagering (e.g., during a particular spin) have joined, processor 204 may spin a plurality of reels, such as reels 728, 730, 732, 734, and 736, as described above, to determine a game outcome. For example, in at least some embodiments, players may take turns selecting a spin button 722A-722X from their respective client device 703A-703X in much the same way that they make take turns, or otherwise allocate control, with respect to selection of mutual wager 726. Accordingly, any of the control options described herein with respect to selection of a mutual wager, such as mutual wager 726, may be applied to selection and control of the option to spin reels 728-736. If the game outcome is a winning outcome, combined credit balance 712 may be incremented by the amount won. Conversely, if the game outcome is non-winning, combined credit balance 712 may be decremented by the amount of mutual wager 726.

During gameplay, any player participating in multiplayer wagering game 702 may select an option to cash out, such as via a cash out button 724A-724X displayed on a respective client device 703A-703X. In response to selection of cash out button 724A-724X, processor 204 may distribute a pro rata share of combined credit balance 712 to the player (s) making the cash out request, such as, for example, in proportion to the relative contribution of the player(s). For instance, in the example above, the fourth player may receive 40% of combined credit balance 712 in response to a request to cash out of wagering game 702 by the fourth player (and at any time during wagering game 702), because the fourth player contributed 40% to combined credit balance 712.

Figure 8:
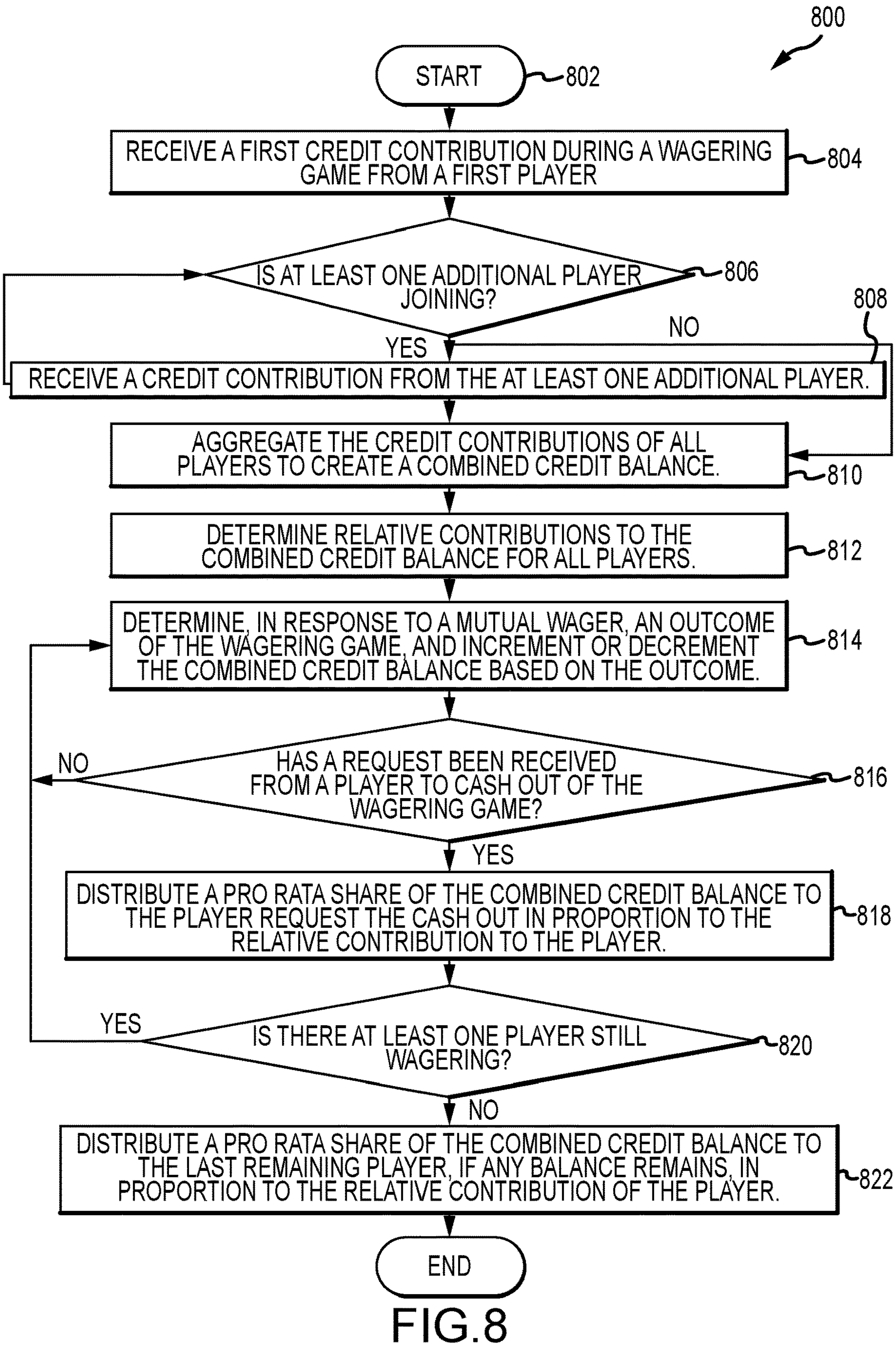
FIG. 8 is a flowchart illustrating an exemplary process for playing a multiplayer, single device, wagering game.

FIG. 8 is a flowchart illustrating an exemplary process 800 for playing a multiplayer, single-device, wagering game. Accordingly, and as described in detail above, a first credit contribution may be received to initiate a multiplayer, single-device, wagering game, such as, for example, from a first player of EGM 302 (step 802). In other embodiments, any number of players may initiate the wagering game by providing a respective credit contribution. For example, processor 204 may determine whether at least one additional player is joining the wagering game, such as, for example, based on a selection of a join button and/or an invite button, as described above (step 804). In addition, as one or more additional players join the multiplayer wagering game, credit contributions from each player may also be received (step 806).

In the exemplary embodiment, once all players have joined the wagering game and provided their respective credit contributions (e.g., prior to at least one spin of the wagering game), processor 204 may aggregate the credit contributions of each participating player to create or tally a combined credit balance, as described above (step 808). The combined credit balance is, in other words, the sum of all player credit contributions. Processor 204 may, in addition, determine a relative contribution to the combined credit balance of each player (step 810). For example, processor 204 may divide the credit contribution of each player by the combined credit balance to determine a percentage contribution to the combined credit balance of each player.

Processor 204 may, in addition, determine an outcome of the wagering game, such as in response to selection of a spin button by one or more players and/or in response to selection of a mutual wager by one or more players participating in the wagering game (step 812). As described herein, if the outcome is a winning outcome, processor 204 may increment the combined credit balance by the amount won. However, if the outcome is non-winning, processor 204 may decrement the combined credit balance by the amount won.

In addition, processor 204 may receive, at any point during the wagering game, such as between spins, a request from one or more players participating in the wagering game to cash out of the wagering game (step 814). In response to receiving such a cash out request, processor 204 may distribute a pro rata share of the combined credit balance to the player, or players, initiating the cash out request (step 816). For example, in at least one embodiment, processor 204 may distribute a pro rata share of the combined credit balance to each player who initiates a cash out request in proportion to the relative contribution, as calculated above, of each player. Finally, processor 204 may determine whether there are any players remaining in the wagering game who still wish to play the wagering game, and if so, gameplay may continue as described herein. If not, however, processor 204 may distribute a pro rata share to the last remaining player and/or permit the last remaining player to play in the multiplayer wagering game alone (steps 818 and 820).

Figure 9:
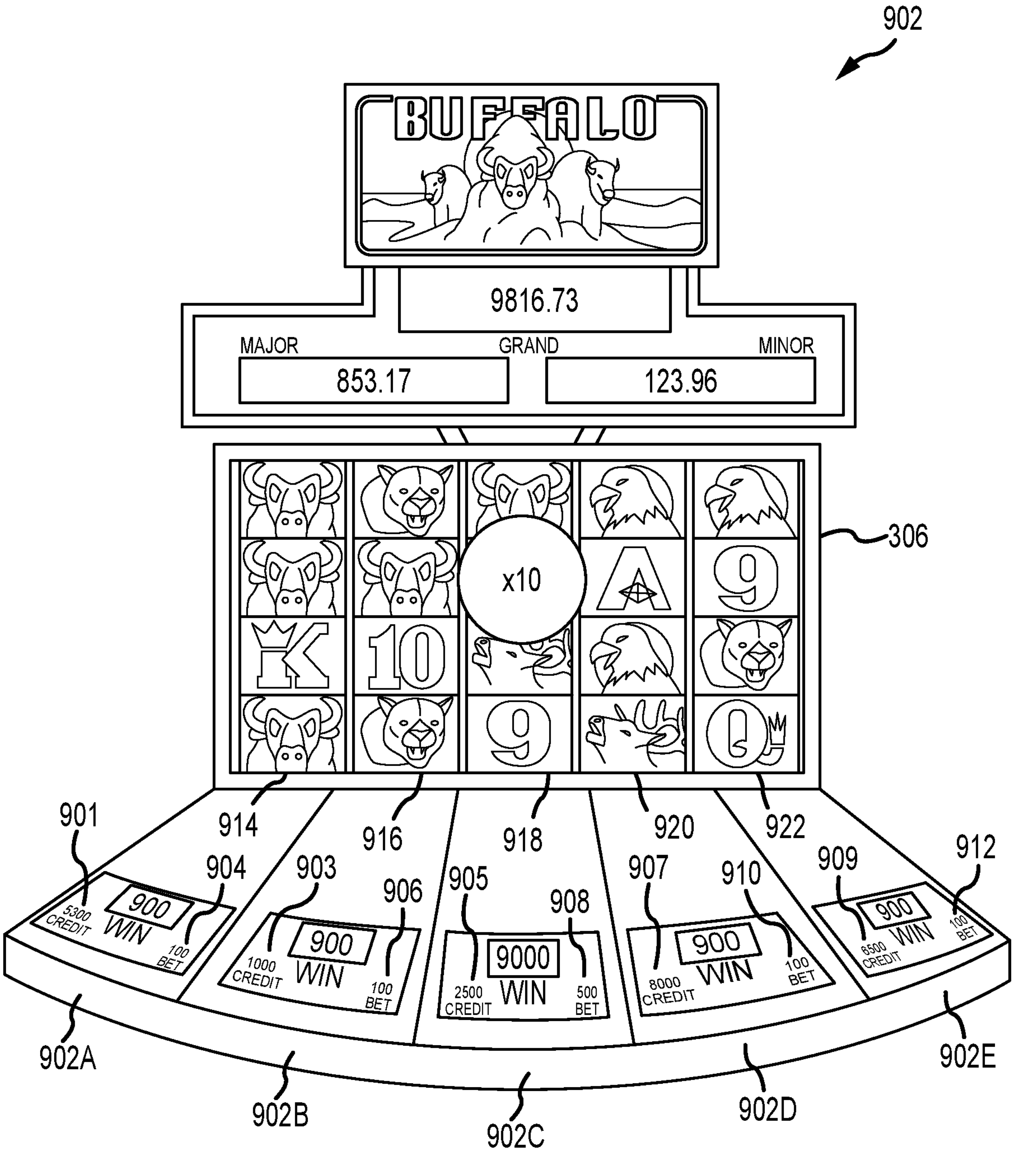
FIG. 9 is a perspective view of an exemplary multiplayer wagering game, in which a plurality of players participate in the multiplayer wagering game around a central display.

FIG. 9 is a perspective view of an exemplary multiplayer wagering game 902, in which a plurality of players participate around a large central or secondary display 306. In various embodiments, wagering game 902 is similar to wagering game 702 (as described above with respect to FIG. 7). For example, a plurality of player client devices 902A, 902B, 902C, 902D, and 902E may positioned around secondary display 306, which may be visible to each of the five players. Although five player client devices 902A-902E are shown, it will be appreciated that any suitable number of player client devices may be included. In addition, although each player client device 902A-902E is shown, in the example, as being positioned in a semi-circular or arcing arrangement around secondary display 306, any other suitable position and orientation may be used. For example, in some embodiments, secondary display 306 may comprise a three-hundred-and-sixty degree display, and a plurality of player client devices may be organized in a circle around the three-hundred-and-sixty degree display. In other embodiments, a plurality of player client devices may be arranged around a central secondary display 306 in a linear configuration and/or around any portion of a circle less than three-hundred-and sixty degrees. In other embodiments, a plurality of player client devices may be arranged around a central secondary display 306 in any other configuration, such as a polygonal configuration (e.g., any rectangular and/or square configuration).

Accordingly, a credit contribution of each player participating in wagering game 902 may be determined, as described herein, and displayed on a respective player interface and/or a plurality of player interfaces. Similarly, a relative contribution of each player may be calculated and displayed. Players are thus able to pool their financial resources to gain access to one or more enhanced gameplay features, such as improved RTP, larger payouts, higher progressive tiers, unlockable bonus features, and the like. A combined credit balance may also be calculated, as described herein and variously displayed. In addition, each player client device 902A-902E may display a cash out button (not shown) and/or a spin button (not shown), each of which may function as described herein.

In addition, in at least some embodiments, each player client device 902A-902E may display a mutual wager option (not shown), as described herein, that a player associated with a respective player client device 902A-902E may use to specify a desired mutual wager. For example, players may use a mutual wager option displayed on their client device 902A-902E to vote on and/or take turns selecting a mutual wager, which may be displayed for group viewing on secondary display 306. Each player client device 902A-902E may also display a credit balance of each player. For example, first player client device 902A may display a first credit balance 901, second player client device 902B may display a second credit balance 903, third player client device 902C may display a third credit balance 905, fourth player client device 902D may display a fourth credit balance 907, and fifth player client device 902E may display a fifth credit balance 909. Credit balances 901-909 may simply reflect each player's respective (e.g., uncombined) credit balance.

In some embodiments, and as shown and described herein, each player may take turns selecting a mutual wager, such as, for example, from one spin to the next. In the example of FIG. 9, each player specifies a mutual wager to be applied in his or her turn. For example, a first player of first player client device 902A may specify a first mutual wager 904 to be applied during the first player's turn, a second player of second player client device 902B may specify a second mutual wager 906 to be applied during the second player's turn, a third player of third player client device 902C may specify a third mutual wager 908 to be applied during the third player's turn, a fourth player of fourth player client device 902D may specify a fourth mutual wager 910 to be applied during the fourth player's turn, and a fifth player of fifth player client device 902E may specify a fifth mutual wager 912 to be applied during the fifth player's turn.

As described herein, once all players who wish to participate in a particular round of wagering (e.g., during a particular spin) have joined, processor 204 may spin a plurality of reels, such as reels 914, 916, 918, 920, and 922, as described above, to determine a game outcome. For example, in at least some embodiments, players may take turns selecting a spin button (not shown) from their respective client device 902A-902E in much the same way that they make take turns, or otherwise allocate control, with respect to selection of a mutual wager. A variety of rules and options for controlling the power to spin reels 914-922 are described above with respect to FIG. 5A and FIG. 5B; these rules and options are equally applicable here. Accordingly, FIG. 9 illustrates one example embodiment of a plurality of player client devices 902A-902E physically organized around a large central or secondary display 306. In addition, the various gameplay options described herein may be variously applied and utilized in wagering game 902.

An electronic gaming system for playing a multiplayer, single-device, wagering game is thus described. In at some embodiments, the multiplayer wagering game is controlled by a single electronic gaming machine and is accessible to, and can be played by, a plurality of players. Each player may select a credit contribution, and a plurality of credit contributions may be provided and pooled in the wagering game. Specifically, the gaming machine may aggregate the credit contribution of each player to create a combined credit balance, and the players may select a mutual wager, which may, as a result of the aggregated credit balance, be greater than a wager that any single player might make playing alone. The players may thus pool their resources to gain access to a variety of enhanced or unlockable gameplay features, such as unlockable bonus features, new tiers of a progressive jackpot, improved return to player (RTP), and the like. Moreover, any of the players participating in the multiplayer wagering game may, in addition, cash out of the wagering game at any time. When a player selects an option to cash out, the gaming machine may distribute a pro rata share of the combined credit balance, which may be incremented and decremented during gameplay according to the rules of the wagering game, according to a relative contribution provided by the player to the combined credit balance.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system for conducting an electronic game, the electronic gaming system comprising:

at least one memory with instructions stored thereon; and at least one processor executing the instructions, wherein execution of the instructions causes the at least one processor to:

receive a first amount of credits comprising a first credit contribution from a first client device of a plurality of client devices for a play of the electronic game, wherein the first client device is associated with a first player account of a plurality of player accounts, wherein each of the plurality of player accounts is associated with a client device of the plurality of client devices associated with the electronic game, the first client device comprising an electronic gaming device;

receive a second amount of credits comprising a second credit contribution from a second client device of the plurality of client devices for the play of the electronic game, wherein the second client device is associated with a second player account of the plurality of player accounts;

determine that the first player account and the second player account are participating in the play of the electronic game based on receipt of the first amount of credits and the second amount of credits;

in response to selection of a spin button at the first client device, cause a plurality of reels to spin and stop at each client device of the plurality of client devices, wherein the spin and stop of the plurality of reels is associated with a game outcome for the play;

determine a first outcome amount to provide to the first player account based upon the first amount of credits and the game outcome;

determine a second outcome amount to provide to the second player account based upon the second amount of credits and the game outcome;

cause display of a first credit balance associated with the first player account at the first client device, the first credit balance comprising the first amount of credits;

cause display of a second credit balance associated with the second player account at the second client device, the second credit balance comprising the second amount of credits; and provide the second credit balance to the second player account based upon a cash out request received from the second client device, wherein after the cash out request is received, at least the first player account and a third player account of the plurality of player accounts still participate in the electronic game.

2. The electronic gaming system of claim 1, wherein the instructions further cause the at least one processor to store proportions of the first amount of credits and the second amount of credits with respect to a third amount of credits comprising the first amount of credits and the second amount of credits in a player contribution table stored in the at least one memory.

3. The electronic gaming system of claim 2, wherein the player contribution table includes a list of the plurality of player accounts and a credit contribution section storing a respective amount of credits contributed by each respective player account of the plurality of player accounts.

4. The electronic gaming system of claim 2, wherein the player contribution table further includes a flag section indicating one of the plurality of player accounts designated to initiate a next play of the electronic game.

5. The electronic gaming system of claim 1, wherein the instructions further cause the at least one processor to assign a pro rata share of a total outcome amount associated with the game outcome for the play to the first player account and the second player account in proportion to the first amount of credits and the second amount of credits.

6. The electronic gaming system of claim 1, wherein the instructions further cause the at least one processor to allow the second player account access to the electronic game in response to selection of a join button at the second client device.

7. The electronic gaming system of claim 1, wherein the instructions further cause the at least one processor to:

designate one of the plurality of player accounts as a host player account associated with a host client device of the plurality of client devices;

receive instructions from the host client device to invite at least one of the first player account or the second player account to join the electronic game; and transmit an invitation to at least one of the first client device or the second client device based upon the instructions received from the host client device.

8. The electronic gaming system of claim 1, wherein the instructions further cause the at least one processor to unlock at least one bonus feature in the electronic game.

9. The electronic gaming system of claim 1, wherein the instructions further cause the at least one processor to cause display of the first credit balance at the first client device and the second credit balance at the second client device as respective, uncombined credit balances.

10. The electronic gaming system of claim 1, wherein the instructions further cause the at least one processor to determine that the first player account has spin control for the play of the electronic game, wherein the second player account does not have spin control for the play of the electronic game.

11. The electronic gaming system of claim 10, wherein the instructions further cause the at least one processor to determine the second player account has spin control for a subsequent play of the electronic game, wherein the second player account does not have spin control for the play of the electronic game.

12. The electronic gaming system of claim 11, wherein the instructions further cause the at least one processor to transfer spin control from the first player account to the second player account in response to the game outcome being a non-winning game outcome.

13. The electronic gaming system of claim 12, wherein the instructions further cause the at least one processor to transfer spin control from the first player account to the second player account by causing the spin button to be displayed at the second client device.

14. A non-transitory, computer readable storage medium having instructions stored thereon that, in response to execution by at least one processor, cause the at least one processor to:

receive a first amount of credits comprising a first credit contribution from a first client device of a plurality of client devices for a play of an electronic game, wherein the first client device is associated with a first player account of a plurality of player accounts, and wherein each of the plurality of player accounts is associated with a client device of the plurality of client devices associated with the electronic game, the first client device comprising an electronic gaming device;

receive a second amount of credits comprising a second credit contribution from a second client device of the plurality of client devices for the play of the electronic game, wherein the second client device is associated with a second player account of the plurality of player accounts;

determine that the first player account and the second player account are participating in the play of the electronic game based on receipt of the first amount of credits and the second amount of credits;

in response to selection of a spin button at the first client device, cause a plurality of reels to spin and stop at each client device of the plurality of client devices, wherein the spin and stop of the plurality of reels is associated with a game outcome for the play;

determine a first outcome amount to provide to the first player account based upon the first amount of credits and the game outcome;

determine a second outcome amount to provide to the second player account based upon the second amount of credits and the game outcome;

cause display of a first credit balance associated with the first player account at the first client device, the first credit balance comprising the first amount of credits;

cause display of a second credit balance associated with the second player account at the second client device, the second credit balance comprising the second amount of credits; and cause the second credit balance to be provided to the second player account based upon an output request received from the second client device, wherein after the output request is received, at least the first player account and a third player account of the plurality of player accounts remain participating in the electronic game.

15. The non-transitory, computer readable storage medium of claim 14, wherein the instructions further cause the at least one processor to assign a pro rata share of a total outcome amount associated with the game outcome for the play to the first player account and the second player account in proportion to the first amount of credits and the second amount of credits.

16. The non-transitory, computer readable storage medium of claim 14, wherein the instructions further cause the at least one processor to determine that the first player account has spin control for the play of the electronic game, wherein the second player account does not have spin control for the play of the electronic game.

17. The non-transitory, computer readable storage medium of claim 14, wherein the instructions further cause the at least one processor to:

designate one of the plurality of player accounts as a host player account associated with a host client device of the plurality of client devices;

receive instructions from the host client device to invite at least one of the first player account or the second player account to join the electronic game; and transmit an invitation to at least one of the first client device or the second client device based upon the instructions received from the host client device.

18. The non-transitory, computer readable storage medium of claim 14, wherein the instructions further cause the at least one processor to unlock at least one bonus feature in the electronic game.

19. A method of electronic gaming implemented by at least one processor in communication with at least one memory, the method comprising:

receiving a first amount of credits comprising a first credit contribution from a first client device of a plurality of client devices for a play of an electronic game, wherein the first client device is associated with a first player account of a plurality of player accounts, and wherein each of the plurality of player accounts is associated with a client device of the plurality of client devices associated with the electronic game, the first client device comprising an electronic gaming device;

receiving a second amount of credits comprising a second credit contribution from a second client device of the plurality of client devices for the play of the electronic game, wherein the second client device is associated with a second player account of the plurality of player accounts;

determining that the first player account and the second player account are participating in the play of the electronic game based on receipt of the first amount of credits and the second amount of credits;

in response to selection of a spin button at the first client device, causing a plurality of reels to spin and stop at each client device of the plurality of client devices, wherein the spin and stop of the plurality of reels is associated with a game outcome for the play;

determining a first outcome amount to provide to the first player account based upon the first amount of credits and the game outcome;

determining a second outcome amount to provide to the second player account based upon the second amount of credits and the game outcome;

causing display of a first credit balance associated with the first player account at the first client device, the first credit balance comprising the first amount of credits;

causing display of a second credit balance associated with the second player account at the second client device, the second credit balance comprising the second amount of credits; and providing the second credit balance to the second player account based upon a cash out request received from the second client device, wherein after the cash out request is received, at least the first player account and a third player account of the plurality of player accounts still participate in the electronic game.

20. The method of claim 19, further comprising-unlocking at least one bonus feature in the electronic game.

* * * * *